March 19, 1935.  G. M. BELLANCA  1,995,090
CONVERTIBLE AIRPLANE
Filed Sept. 2, 1932
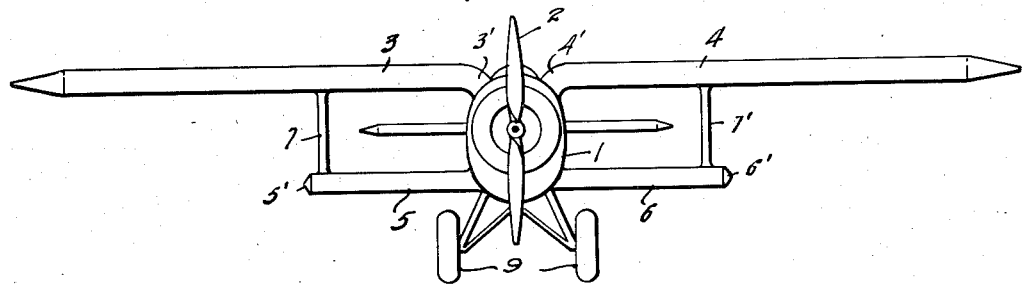
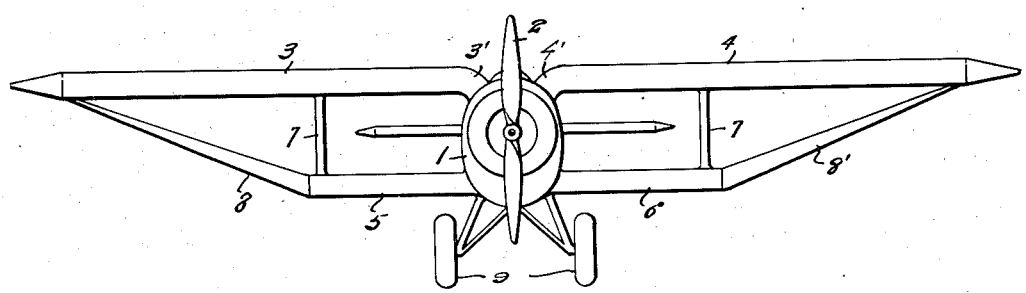
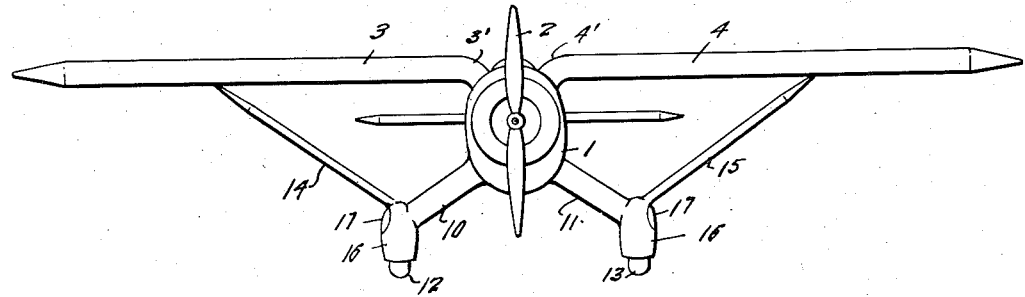
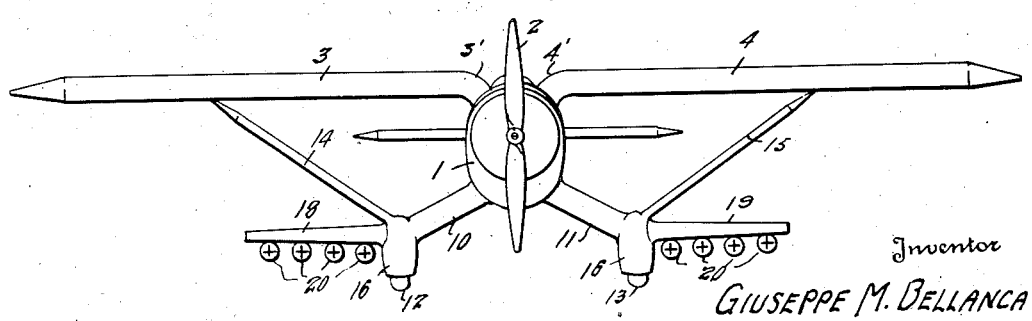
Inventor
GIUSEPPE M. BELLANCA
By Semmes & Semmes
Attorneys Patented Mar. 19, 1935

1,995,090

UNITED STATES PATENT OFFICE 1,995,090

CONVERTIBLE AIRPLANE

Giuseppe M. Bellanca, New Castle, Del.

Application September 2, 1932, Serial No. 631,550

9 Claims. (Cl. 244—12)

This invention relates to aircraft and more particularly to a convertible airplane.

An object of the present invention is to provide an airplane of the convertible type.

Another object is to provide an airplane which may readily be converted from substantially a monoplane to a biplane type.

Another object is to devise an airplane of standard type which may readily and easily be modified to increase its load carrying characteristics.

With these and other equally important objects in view the invention comprehends the concept of providing an airplane of improved design by reason of which it may readily be converted, by adding airfoil surfaces, to a different type having an increased carrying capacity. In order to enable a ready comprehension of the invention, physical embodiments are shown in the accompanying drawing, in which:

Fig. 1 is a front elevation of one form of airplane constructed according to the present invention.

Fig. 2 is a view similar to Fig. 1 showing the airplane of Fig. 1 converted to another type.

Figs. 3 and 4 are similar to Figs. 1 and 2 respectively of a specifically different design of airplane.

In certain airplanes, particularly in the military type, it has been found desirable to provide one which in essential features is standardized but which may readily be converted so as to adapt it to other purposes. For example, it has been found desirable to provide an airplane which may be simply modified so as to function either as a pursuit plane or a bombing plane. This has become particularly true in view of the recent developments tending toward the production of very high speed bombers.

In accordance with the present invention a standard plane may be produced which, by a very slight modification in structure, may be modified so as to adapt it to a relatively wide field of use. A typical embodiment of such a concept is shown in Figs. 1 and 2. The airplane, for example, may comprise a fuselage 1 provided with a suitable power plant and driven by the tractor propeller 2. The plane is provided with the main wing sections 3 and 4 permanently secured to the upper portion of the fuselage. Preferably these are of gull shape, that is to say are formed with root sections 3' and 4' which are displaced from the main plane of the wing. Such a construction provides improved vision.

To improve the maneuverability and generally to give the desirable characteristics of biplane construction, stub wings 5 and 6 are permanently attached to a lower portion of the fuselage. These may be of any desired span and cord and may or may not be staggered with respect to the upper wing. Preferably the wing structure is rigidified and generally improved by interconnecting the stub wings and main wings by the interplane struts 7 and 7'. Such a structure, as will be appreciated, presents the essential aerodynamic characteristics of a biplane. In some circumstances it is advantageous to utilize a plane such as that described for purposes in which increased stability is desired. A typical field of such use is in observation planes. This extended use may readily be accomplished in accordance with the present invention by constructing the stub wings 5 and 6 so that additional wing sections may be readily attached to their wing tips. As shown in Fig. 1 the tips of stub wings 5 and 6 are provided with detachable tip pieces 5' and 6'. In converting such a plane, as described above, the wing tips 5' and 6' may be removed and to the exposed wing tips may then be attached the lift struts 8 and 8'. The end of the lift struts 8 and 8' are attached to the underside of the main wings and preferably to fixtures permanently attached to the leading and trailing spars thereof.

The lift struts 8 and 8' may comprise stock construction so as to be immediately available for attachment to the biplane of Fig. 1. After the attachment of the lift struts the plane is then converted into one of the sesqui-plane type, having considerably improved lateral stability. The lift struts may be of any desired shape and aspect ratio. The planes of Figs. 1 and 2 may be provided with any suitable type of landing gear, indicated generally at 9. With such a conversion the load carrying factor of the plane is considerably increased and, as noted above, the lateral stability considerably enhanced.

Such extensions of the potential use of a standard plane may be achieved in other specific structures, such for example as in a plane of the type shown in Fig. 3. Such airplane may, like the plane previously described, comprise a fuselage 1 driven by a tractor propeller 2 and having the main sustenation surfaces 3 and 4. In this type of plane the stub wings 10 and 11 are provided which are permanently secured to a lower portion of the fuselage. These are set at a rather decided negative dihedral and, like the stub wings 5 and 6, may be of any desired aspect ratio. These wings preferably are of rugged construction and are adapted to directly carry the landing wheels 12 and 13. To the end of each of the stub wings 10 and 11 are connected respectively the lift struts 14 and 15. The joints between the stub wings, lift struts and the landing wheel fixtures are completely faired by fairing 16. This fairing has a detachable section 17 which may readily be removed, exposing the tip or end of the stub wing. This tip or end is provided with permanent fixtures, such as hinge fixtures. When it is desired to convert such an airplane the covers 17 may be removed and the supplemental wings 18 and 19 mounted. If desired, suitable guy wires or interplane struts may be attached at one end to the wings 18 and 19 and at the other ends to any suitable portion of the plane to impart increased strength and rigidity. Such a plane when converted is adapted to a wider use. After the attachment of the supplemental wings 18 and 19, which may of course be of any desired span, the plane comprises essentially a biplane, the lower planes of which include an internal negative dihedral section and an external substantially horizontal section. The lift struts 14 and 15, besides giving increased lift to the plane, serve to strengthen and rigidify the lower wings, serving as they do to take both landing and flying stresses. The lower wings 18 and 19 may be suitably conformed so as to serve as carriers for load 20 which, for example, may comprise bombs or other articles. It will be seen that such a type of plane presents very high load carrying characteristics and may be converted from a standard plane of simple and rugged construction.

While typical embodiments of the invention have been shown, these are given merely as examples of the underlying principles involved. They are, therefore, not considered to restrict the invention beyond the restrictions clearly imposed by the appended claims.

I claim:

1. An airplane comprising a fuselage, main wing sections attached to the upper portion of the fuselage, stub wings of negative dihedral permanently secured to the lower portion of the fuselage and a supplemental wing detachably secured to the stub wing and extending horizontally therefrom and means on the supplemental wing to detachably secure loads thereto.

2. An airplane comprising a fuselage, main wing sections attached to the upper portion of the fuselage, stub wings of negative dihedral permanently secured to a lower portion of the fuselage, strut wings attached at one end to the main wing and at the other to an end of the stub wing, and a supplemental wing section detachably secured to the stub wing and extending laterally therefrom.

3. An airplane comprising a fuselage, main wing sections secured to the upper portion of the fuselage, stub wings of negative dihedral secured to the lower portion of the fuselage, lift struts connected at one end to the tip of the stub wing and at the other to an underside of the main wing, and supplemental wings detachably secured to the stub wings and extending substantially horizontally therefrom.

4. An airplane comprising a fuselage, main wing sections attached to the upper portion of the fuselage, stub wing sections of negative dihedral permanently secured to a lower portion of the fuselage, strut wings permanently secured, at one end to the stub wing and at the other to the under side of the main wing, and a supplemental wing section detachably secured to the stub wing adjacent the point of connection of the strut wing thereto, said supplemental wing extending substantially horizontally from the stub wing.

5. An airplane comprising a fuselage, main wing sections attached to the upper portion of the fuselage, stub wing sections permanently secured to a lower portion of the fuselage, strut wings permanently secured, at one end to the stub wing and at the other to the under side of the main wing, and a supplemental wing section detachably secured to the stub wing adjacent the point of connection of strut wing thereto, said supplemental wing extending substantially horizontally from the stub wing.

6. An airplane comprising a fuselage, main wing sections attached to the upper portion of the fuselage, stub wing sections of negative dihedral permanently secured to a lower portion of the fuselage, strut wings permanently secured, at one end to the stub wing and at the other end to the under side of the main wing and a supplemental wing section of relatively shorter span than the main wing section detachably secured to the stub wing adjacent the point of connection of the strut wing thereto, said supplemental wing extending substantially horizontally from the stub wing.

7. An airplane comprising a fuselage, main wing sections attached to the upper portion of the fuselage, stub wings of relatively shorter span than the main wing permanently secured to the lower portion of fuselage, landing wheels secured to the stub wings adjacent their extremities, strut wings permanently secured, at one end to the extremity of the stub wing and at the other to the under side of the main wing, and a supplemental wing section of a relatively short span detachably secured to the stub wing adjacent the point of connection of the strut wing thereto.

8. An airplane comprising a fuselage, main wing sections attached to the upper portion of the fuselage, stub wing sections permanently secured to a lower portion of the fuselage, strut wings permanently secured at one end to the stub wing and at the other to the underside of the main wing, and a supplemental wing section detachably secured adjacent the point of connection of the strut wing and stub wings, said supplemental wing section extending substantially horizontally from the stub wing.

9. An airplane comprising a fuselage, main wing sections attached to the upper portion of the fuselage, stub wings of negative dihedral permanently secured to a lower portion of the fuselage, strut wings attached at one end to the main wing and at the other to an end of the stub wing, and a supplemental wing section detachably secured adjacent the point of connection of the stub wing and strut wing and extending laterally from the stub wing.

GIUSEPPE M. BELLANCA.